(12) United States Patent
Hey

(10) Patent No.: US 6,965,224 B1
(45) Date of Patent: Nov. 15, 2005

(54) METHOD AND APPARATUS FOR TESTING SYNCHRONIZATION CIRCUITRY

(75) Inventor: George Michael Hey, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/440,276

(22) Filed: May 16, 2003

(51) Int. Cl.[7] .......................... G01R 23/12; H03L 7/06
(52) U.S. Cl. .................................. 324/76.53; 327/156
(58) Field of Search .................. 324/76.53, 76.52, 324/76.39, 76.11, 96, 158, 753, 601, 613, 324/603–606, 76.59; 327/105, 113, 114, 327/156, 157; 455/208, 265, 502; 331/1 R, 331/2, 4, 55, 172, 156, 157, 16, 25, 74

(56) References Cited

U.S. PATENT DOCUMENTS

| | | | | |
|---|---|---|---|---|
| 3,916,334 A | * | 10/1975 | Hugenholtz | 331/4 |
| 5,019,785 A | * | 5/1991 | Fognini et al. | 327/105 |
| 5,057,771 A | * | 10/1991 | Pepper | 324/753 |
| 5,150,078 A | * | 9/1992 | Yang et al. | 331/2 |
| 6,308,076 B1 | * | 10/2001 | Hoirup et al. | 455/502 |
| 6,845,462 B2 | * | 1/2005 | Yatsuda et al. | 713/501 |
| 6,859,027 B2 | * | 2/2005 | Li et al. | 324/76.53 |
| 6,859,028 B2 | * | 2/2005 | Toner | 324/76.53 |

OTHER PUBLICATIONS

Mitel Semiconductor, "MT9045 T1/E1/OC3 System Synchronizer Advance Information", Issue 3, Aug. 2000, pp. 1-25.

* cited by examiner

Primary Examiner—Anjan Deb
Assistant Examiner—Hoai-An D. Nguyen
(74) Attorney, Agent, or Firm—Marger Johnson & McCollom, PC

(57) ABSTRACT

A test circuit receives a reference signal having a reference frequency and generates a synchronizer input signal having a synchronizer input frequency for inputting into a synchronizer circuit. A frequency generator is configured to offset the synchronizer input frequency at selectable frequencies from a nominal frequency value. An offset measurement circuit is configured to compare the frequency offset for the synchronizer input frequency with the frequency offset of a synchronizer output signal.

16 Claims, 7 Drawing Sheets

METHOD AND APPARATUS FOR TESTING SYNCHRONIZATION CIRCUITRY

BACKGROUND

A communications system such as a multi-service router may employ one or more synchronous interfaces such as T1 or E1 interfaces. It is often desirable to exchange data received on one interface with another interface for transfer to an external communications system. In order to make different communication systems synchronous, it may be necessary to transfer clocking information from one communications system to one or more different communications systems using these interfaces. Synchronous data transfer without data loss requires such systems to be synchronized.

Synchronous interfaces may transfer clocking information embedded/encoded in the data itself. Alternatively, synchronous interfaces may use a separate medium to transfer clocking, other than the medium used to transfer data. Examples of such synchronous serial interfaces include those defined by the Electronic Industries Association EIA-530 and EIA-449 standards.

A T1 or E1 interface embeds clocking information in the data stream. A T1/E1 receiver may then recover the clocking information using PLL (phase locked loop) techniques. For example, a T1 line rate clock is 1.544 MHz (Million Hertz) while an E1 line rate clock is 2.048 MHz. A common submultiple of both of these frequencies is 8 kHz (thousand Hertz). Dividing a recovered T1 or E1 line rate clock by 193 or 256, respectively, yields 8 kHz. Thus, in time division multiplexed (TDM) systems, 8 kHz is often used as a convenient frequency to which a system TDM synchronizer locks.

FIG. 1 shows a host system general TDM clocking scheme 10. The host system in one embodiment is a network processing device such as a router, switch, gateway, Private Branch Exchange (PBX), or any other type of device that requires clock synchronization. A TDM synchronizer 12 outputs a 32.768 MHz master clock (CLK_32M) 14 to a TDM clock formatting and distribution subsystem 16. Under system software control, the TDM master clock 14 may free-run according to a local (i.e. internal) frequency reference or it may phase lock to a frequency reference (RSYNC) 18 recovered from an external synchronous interface such as a T1 or E1 lines 20_1–20_N.

One or more T1 or E1 lines 20 may be connected to a Wide Area Network (WAN) 21 that can include Public Switched Telephone Networks (PSTN), Frame Relay, Asynchronous Transfer Mode (ATM) and Internet Protocol (IP) packet switched networks. One or more T1 or E1 lines 25 may also be connected directly to additional host systems 27 including a router, switch gateway or PBX located downstream from host system 10.

In one embodiment, the TDM synchronizer 12 slaves off a clock generated by the WAN 21. In another embodiment, the synchronizer 12 provides the master clock for other devices in WAN 21. The master clock 14 is used by the TDM clock formatting and distribution subsystem 16 to generate, format, and distribute TDM clocking 22 to various synchronous interfaces 24_1–24_N and 26 used for data exchange and for clocking transfer.

The clocking 22 includes the Layer1 clock (L1CLK) and also an associated sync pulse (L1SYNC) that occurs with an 8 kHz frequency used to delimit 125 us (microsecond) long TDM frames. Each L1CLK/L1SYNC pair is delivered to the "back end" of a synchronous interface such as a T1 or E1 Framer/Line Interface Unit (LIU) 24_1–24_N. A CLK/SYNC pair is also delivered to a TDM time/space switch 26 that provides data exchange among the interfaces 24_1–24_N.

FIG. 2 shows in more detail one of the T1/E1 framer/LIUs 24. The receive clock recovery (Rx PLL) block 30 provides clocking for data recovery and also provides RSYNC (recovered 8 kHz) to the host TDM subsystem 16 shown in FIG. 1. The transmit port 32 of the T1/E1 line 20 may optionally be loop timed or internally timed. An internally timed transmit port 32 derives its transmit clock from the L1CLK 34 received from the TDM subsystem 16. A loop timed transmit port 32 derives its transmit clock from a receive clock recovered from receive port 33 via receive clock recovery (RxPLL) block 30.

In either case, the T1/E1 framer exchanges receive data (L1RxD) 38 and transmit data (L1TxD) 40 with the host TDM switch 26 based on CLK_32M 14 using its L1CLK/L1SYNC pair 34/36. Receive data and transmit data are stored in elastic store buffers 42 in the framer 24 and allow for phase deviations between the T1/E1 line interface clocking and the back end CLK_32M based clocking 34/36.

The host TDM clocking system 10 (FIG. 1) can transfer its timing reference via the internally timed T1/E1 interface 24 to another TDM subsystem for example, in another network processing device. The TDM synchronizer in the other network processing device must select the RSYNC derived from its respective T1/E1 framer/LIU 24 as the reference that its system master TDM synchronizer 12 locks. In this manner, a clocking hierarchy may be formed from one system to the next.

FIG. 3 shows in more detail the system master TDM synchronizer 12 in FIG. 1 that uses a digital phase locked loop (DPLL) synchronizer 50 with various features followed by an analog phase locked loop (APLL) 54. The DPLL 50 provides most of the TDM synchronization functions, providing a 16.384 MHz output frequency 56. The DPLL uses a fixed 20 MHz master oscillator (20 MHz TCXO) 52, with high quality frequency accuracy and stability. In one embodiment, the DPLL 56 is a model no. MT9045A manufactured by Zarlink Corporation. Of course, other types of DPLLs can be used. The DPLL 56 is controlled by the host system 10 via control signals 19. The DPLL 50 also provides a DPLL lock detect output 51 indicating to the host system whether its 16.384 MHz output 56 is phase locked to its Ref_in input 18.

The DPLL 50 can accept an 8 kHz input frequency reference (Ref_in) 18, with the capability of phase locking its output Fout_DPLL (16.384 MHz) 56 to Ref_in 18. In one embodiment, the capture and lock range of the DPLL 50 is +/−230 parts per million (ppm) minus the +/−ppm accuracy of the 20 MHz oscillator signal 58. The APLL 54 attenuates inherent jitter from the DPLL 50 while doubling the 16.384 MHz signal 56 to 32.768 MHz. This is a convenient frequency employed for the formatting of TDM interface back-end clocking signals.

The lock range of the APLL 54 may be narrower than that of the DPLL 50, due to dependence upon the parameters of crystal 60, trim capacitors 62 and of the integrated circuitry inside APLL 54. For example, crystal frequency parameters may be affected by process variation, temperature and aging.

PLLs used for synchronization and timing recovery have practical design limitations. One such limitation is frequency capture and lock range. T1 and E1 standards mandate lock range requirements based on clocking stratum hierarchy. The widest lock range is required of the Stratum 4 hierarchical level. For T1 circuits, this requirement is +/−32 ppm relative to its nominal line rate while that for E1 is +/−50 ppm.

Good jitter performance, crystal based, analog PLLs used in TDM synchronization circuits typically have lock ranges limited by several factors such as the "pullability" of the frequency of the crystal oscillator circuit. Furthermore, crystal aging, temperature, and initial tolerance as well as trim frequency offset variations and accuracy of the trim capacitors in the APLL 54 affect its center frequency as well as its maximum-to-minimum frequency lock range.

These combined effects yield a typical lock range for the APLL 54 that is significantly narrower than that of the DPLL 50. Hence, the APLL 54 dominates the overall synchronization lock range. Due to the lock range variability of the APLL 54 resulting from component and environmental variations, it is necessary to test the clocking scheme during manufacture to guarantee lock range specifications are met.

To confirm the lock range requirement is met, the system master TDM synchronizer 12 must be tested for its ability to lock input frequency references that span the desired +/−ppm lock range, with some guard banding factored in. This requires not only accurate input reference frequency synthesis, but also requires circuitry to confirm the output frequency (Fout)14 of the master TDM synchronizer 12 (FIG. 1) is locked to its reference input (Ref_in) 18.

SUMMARY OF THE INVENTION

A phase locked loop synchronization circuit generates an output frequency locked to one of a selection of input reference frequencies, or to a fixed, accurate time base frequency. A test circuit uses the fixed, accurate time base frequency reference signal to generate an output frequency with controlled frequency offset as one of the phase locked loop synchronizer input reference frequency selections. A measurement circuit measures the time base offset difference between the phase locked loop synchronizer frequency output and the selectable frequency reference. A zero relative offset measurement effectively indicates a locked condition for the phase locked loop synchronizer.

In another aspect of the invention, the synchronizer output is configured to be locked to the fixed, accurate time base. The measurement circuit measures the time base offset of its selected frequency reference relative to the accurate time base, thereby providing a means to measure the accuracy of external frequency references.

In another aspect of the invention, the synchronizer reference frequency input selection is configured to be from the offset frequency generator output while the same generator output is used as the measurement circuit's selectable frequency reference. A zero relative offset measurement indicates that the phase locked loop synchronizer is locked to that offset frequency. Confirmation of lock for various generated offset frequencies spanning a required range provides a means of verifying the phase locked loop synchronizer capture and/or lock range.

DETAILED DESCRIPTION

Figure 3:
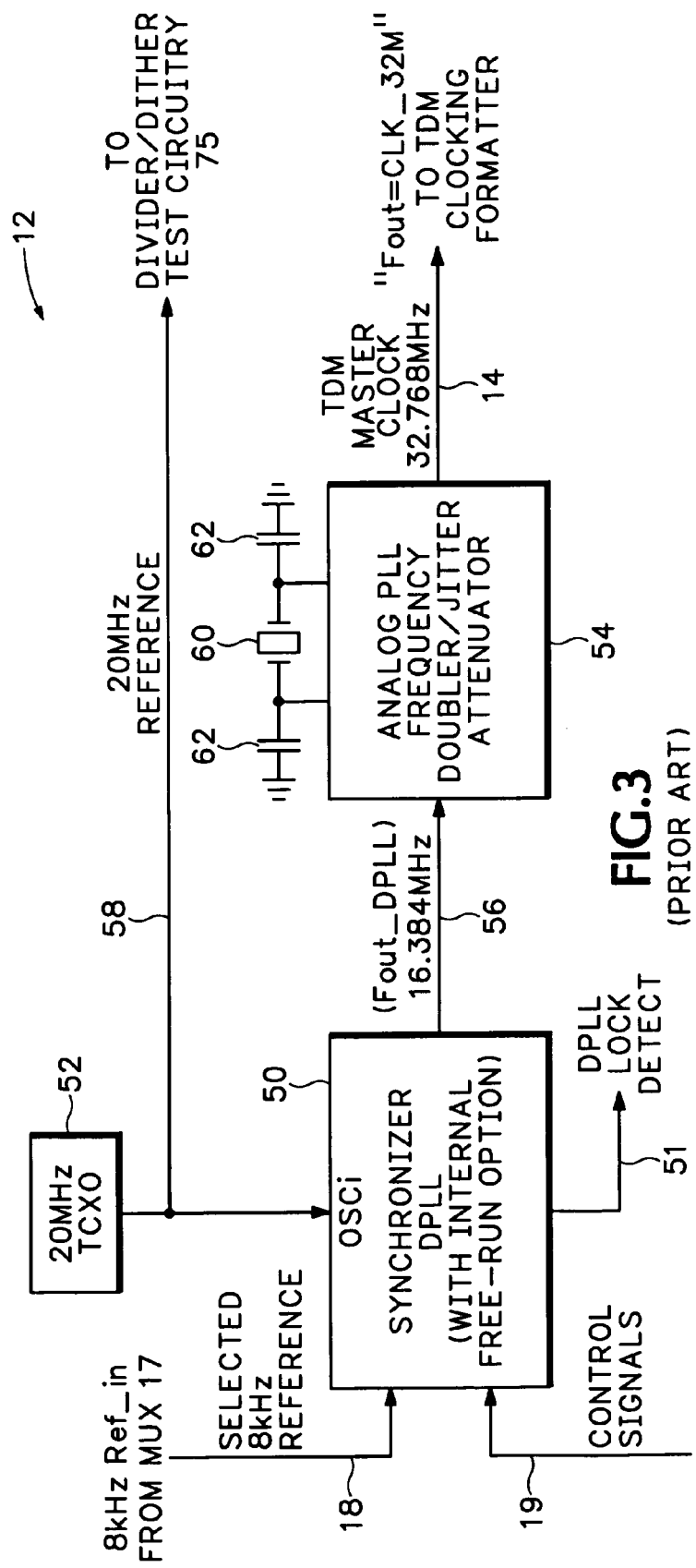
FIG. 3 is a block diagram of the synchronizer circuit shown in FIG. 1.

In order to confirm that the APLL 54 and the DPLL 50 together are capable of locking to the required range of input frequencies, a frequency synthesis scheme using dithering techniques is employed to produce an 8 kHz+/−"offset" ppm frequency at the input to the DPLL 50 (FIG. 3).

A suitably chosen low frequency (Flow) and high frequency (Fhigh) are used to synthesize the input reference frequency (Ref_in). To confirm that the APLL and DPLL are locked, a frequency counter clocked from Fout (32.768 MHz) of APLL 54 measures the number of counts over an integral number N of Ref_in 18 periods. When locked, the resulting count should be N*32768/8=N*4096. Any deviation from this count represents a "ppm" difference of output Fout_APLL 14 relative to the input frequency Ref_in 18.

The same integration frequency counter can be used to measure the absolute deviation of an external 8 kHz RSYNC signal relative to the accurate/stable 20 MHz signal. In one embodiment, the 32.768 MHz output Fout of synchronizer 12 is derived from the stable 20 MHz clock using a "free-run" mode in the DPLL 50 under software control. The above mentioned frequency counter counts the number of Fout_APLL counts over a number of externally recovered RSYNC 8 kHz periods (Ref_in). In this case, any deviation from the expected count (N*32768/8) represents a "X" ppm difference of 20M_clk accuracy relative to the 8 kHz Ref_in ppm accuracy. With a 10 ms (millisecond) integration period for example, the granularity "X" of this measurement is 3.05 ppm per count deviation. The accuracy of the measurement is +/−(1.5 ppm+accuracy of 20M_clk).

This testing scheme provides self diagnostics to confirm proper operation and lock range testing of the combined synchronizer DPLL 50 and analog PLL 54 (FIG. 3) used in the TDM clock synchronization scheme. Together with the DPLL lock detect output 51, the root cause for failure to lock can be narrowed to either the DPLL 50, or the analog PLL 54. This scheme precludes the need to use expensive frequency synthesis and measurement equipment on the manufacturing line. This testing scheme also allows, via remote (e.g., Telnet) access to a router or TDM capable system, the ability to measure the recovered clock reference accuracy of an incoming T1/E1 or PRI line connected to the PSTN or other synchronization network. It also provides a useful tool for remote troubleshooting of timing and synchronization problems.

Figure 4A:
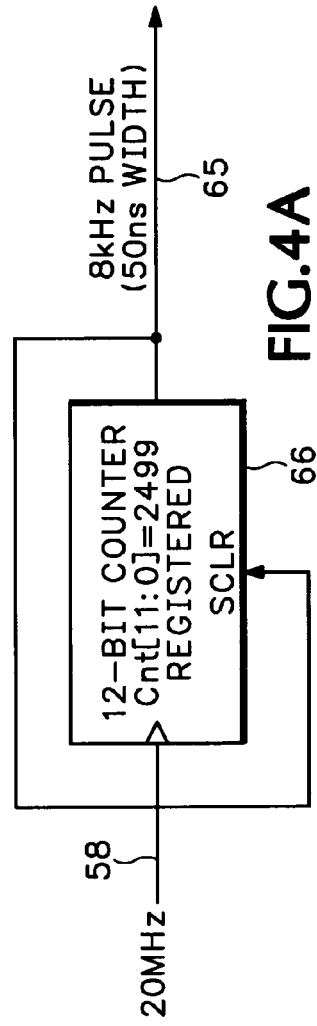
FIG. 4A is a block diagram of a reference counter.

FIG. 4A shows a counter 66 that generates an 8 kHz output signal 65 from a 20 MHz clock input signal 58. In one embodiment, the counter 66 is a 12-bit, binary, modulo 2500 counter that is synchronously cleared via a registered output that goes high when the count reaches 2499. Thus, the counter 66 repeats a count cycle from 0 to 2499. Its registered output signal 65 yields an 8 kHz frequency (20 MHz/2500=8 kHz) with a 50 ns (nanosecond) pulse width.

Figure 4B:
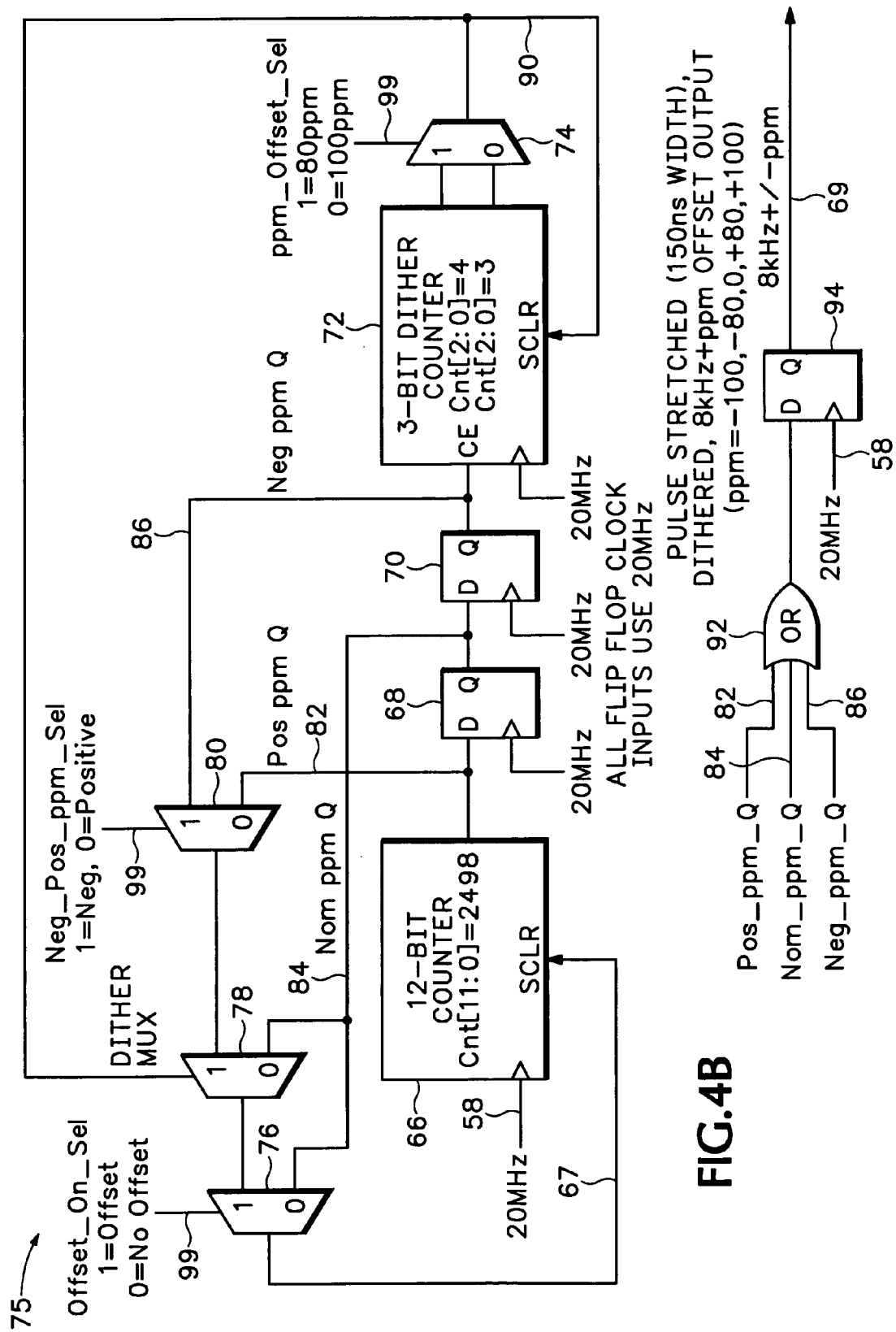
FIG. 4B is a block diagram of a frequency generator.

The scheme in FIG. 4B is based on the counter circuit shown in FIG. 4A and can generate a dithered, 8 kHz+ "ppm" offset frequency reference from a 20 MHz input. The ppm values are selectable, in this example −100, −80, 0, +80, +100 ppm. The output is pulse stretched to a 150 ns width to satisfy a 100 ns minimum 8 kHz reference pulse width required by the DPLL 56. However, any pulse width can be used depending on the specific requirements of the circuitry.

The 12-bit counter 66 has an output that goes high one count early, at 2498. This output is labeled "Pos_ppm_Q" because if it were directly connected to the synchronized clear (SCLR) input 67, the modulo counter 66 would continuously complete its cycle every 2499 50 ns cycles (counting from 0 to 2498) resulting in a frequency of approximately 8 kHz+400 ppm. Likewise, if a "Neg_ppm_Q" signal 86 output from D-flip flop 70 were directly connected to the SCLR input 67, the modulo counter 66 would continuously complete its cycle every 2501 50 ns cycles (counting from 0 to 2500) resulting in a frequency of approximately 8 kHz−400 ppm.

If a "Nom_ppm Q" signal 84 output from D flip-flop 68 were tied directly to the SCLR input 67, the output of counter 66 would pulse at a nominal 8 kHz frequency. By controlling which of the three signals 82, 84 and 86 is fed back to the SCLR input 67 of the counter 66 for each modulo count cycle, the average output period and hence average frequency over a number of these modulo count cycles can be varied within +400 ppm and −400 ppm limits.

Figure 5:
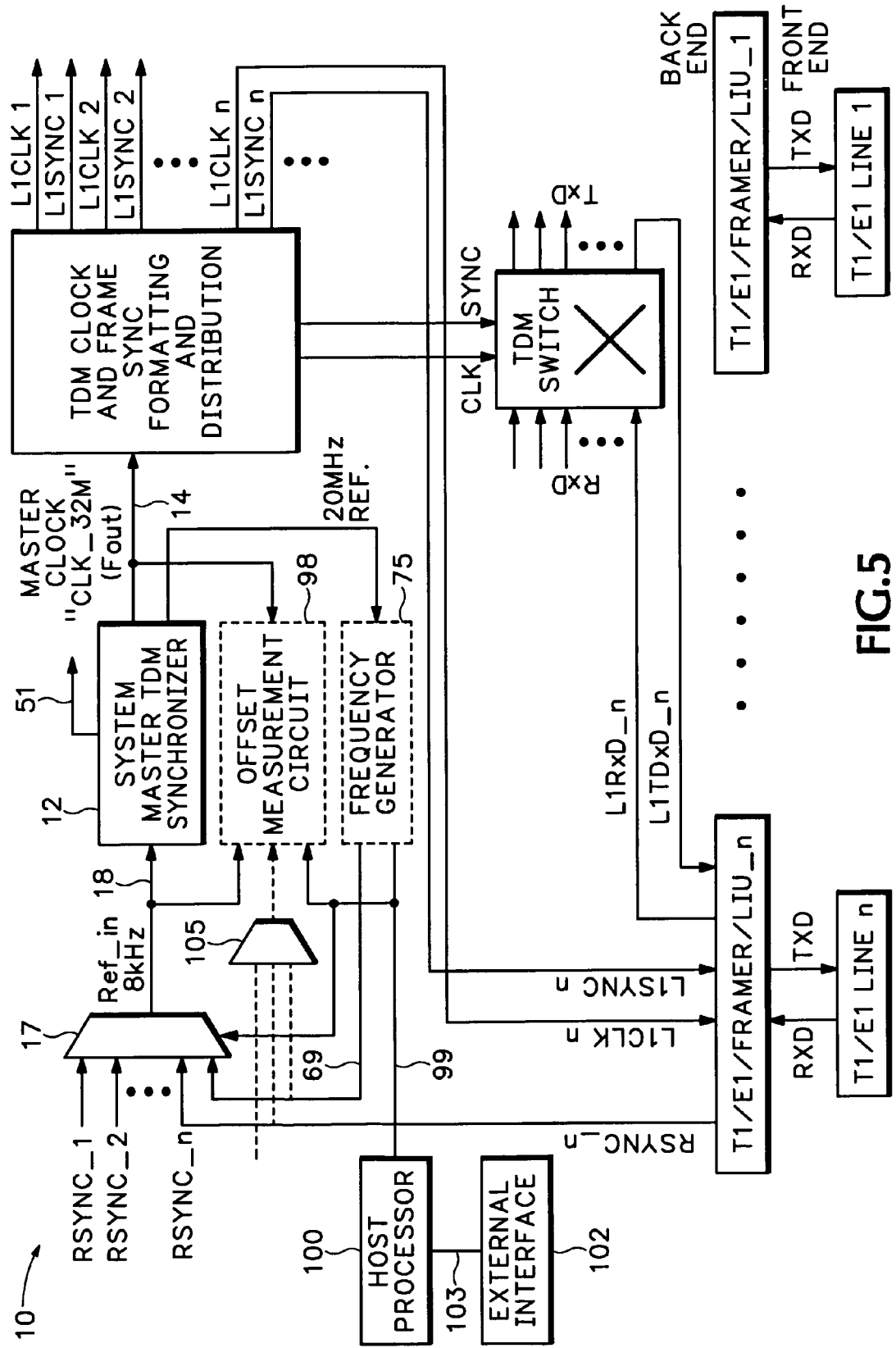
FIG. 5 is the network processing device previously shown in FIG. 1 that includes a frequency offset measurement circuit and the frequency generator previously shown in FIG. 4B.

The dither control circuitry consists of a dither counter 72, a dither multiplexer (mux) 78, and three muxes 74, 76, and 80 controlled by a host processor 100 (FIG. 5). The host system 10 (FIG. 5), such as a network router, switch, gateway, PBX, etc. directs processor 100 to assign static settings 99 to the host controlled muxes 74, 76 and 80 according to a desired ppm offset. The ppm offsets can be programmed in software or hardware or can be input to the processor 100 through an external interface 102 shown in FIG. 5.

When setting 99 on mux 76 is set to 0 (Offset_On_Sel=0), the Nom_ppm_Q signal 84 is selected as the SCLR input 67 of counter 66. This results in a non-dithered, nominal 8 kHz frequency generation (i.e. offset=0 ppm.). If setting 99 for mux 76 is set to 1, the source for the SCLR input 67 varies according the selected output of dither mux 78. The dither mux 78 dynamically selects between Nom_ppm_Q signal 84 and Neg_ppm_Q signal 86, if the Neg_Pos_ppm_Sel setting 75 for mux 80 is set to 1. Otherwise the dither mux 78 dynamically selects between Nom_ppm_Q signal 84 and Pos_ppm_Q signal 82, for the case when the Neg_Pos_ppm_Sel setting 99 for mux 80 is set to 0. Again, the Neg_Pos_ppm_Sel setting 99 is generated by host processor 100 (FIG. 5).

The count enable input (CE) for the 3-bit binary modulo "dither" counter 72 is controlled by the Neg_ppm_Q signal 86 which is the delayed pulse output from the 12-bit modulo counter 66. The dither counter 72 is enabled for one 20 MHz cycle for every complete 12-bit counter count cycle (either 2499, 2500, or 2501 20 MHz clock cycles). The 3-bit binary modulo "dither" counter is synchronously cleared when its count=4 or 3 when the ppm_Offset_Sel mux 74 selector 99 is statically set to 1 or 0, respectively. Thus, the dither counter 72 repeats its cycle every five or four, respectively, count enables (i.e., every five or four 12-bit counter count cycles). The dither counter SCLR signal 90 controls the dither mux 78 by selecting the non-"Nom_ppm_Q" signal from mux 80 during every fifth or fourth, respectively, 12-bit counter count cycle. This dithers the 12-bit counter's count cycle period once every five cycles or once every four cycles, respectively.

For the five cycle, positive ppm case, averaged over the five cycle period of the dither counter 72, the average 12-bit counter cycle period is:

$$T = (50\ ns*((4*2500)+(1*2499)))/5 = 124.99\ us.$$

$$F = 1/T = 8.00064\ kHz = 8\ kHz + 80\ ppm,$$

where $(1-(124.99\ us/125\ us))*1,000,000$ parts per million (ppm)=80 ppm

For the four cycle, negative ppm case, averaged over the four cycle period of the dither counter 72, the average 12-bit counter cycle period is:

$$T = (50\ ns*((3*2500)+(1*2501)))/4 = 125.0125\ us.$$

$$F = 1/T = 7.9992\ kHz = 8\ kHz - 100\ ppm$$

The following table indicates values for all five cases:

TABLE 1.0

| Offset_On_Sel | Neg_Pos_ppm_Sel 0 = pos 1 = neg | ppm_Offset_Sel | # of 12-bit counter cycles per dither counter cycle | Average Period (us) | Average Frequency (kHz) | Offset relative to 8 kHz (ppm) |
|---|---|---|---|---|---|---|
| 1 | 0 | 0 | 4 | 124.9875 | 8.000800 | +100 |
| 1 | 0 | 1 | 5 | 124.9900 | 8.000640 | +80 |
| 0 | x | x | N/A | 125.0000 | 8.000000 | 0 |
| 1 | 1 | 1 | 5 | 125.0100 | 7.999360 | −80 |
| 1 | 1 | 0 | 4 | 125.0125 | 7.999200 | −100 |

Figure 1:
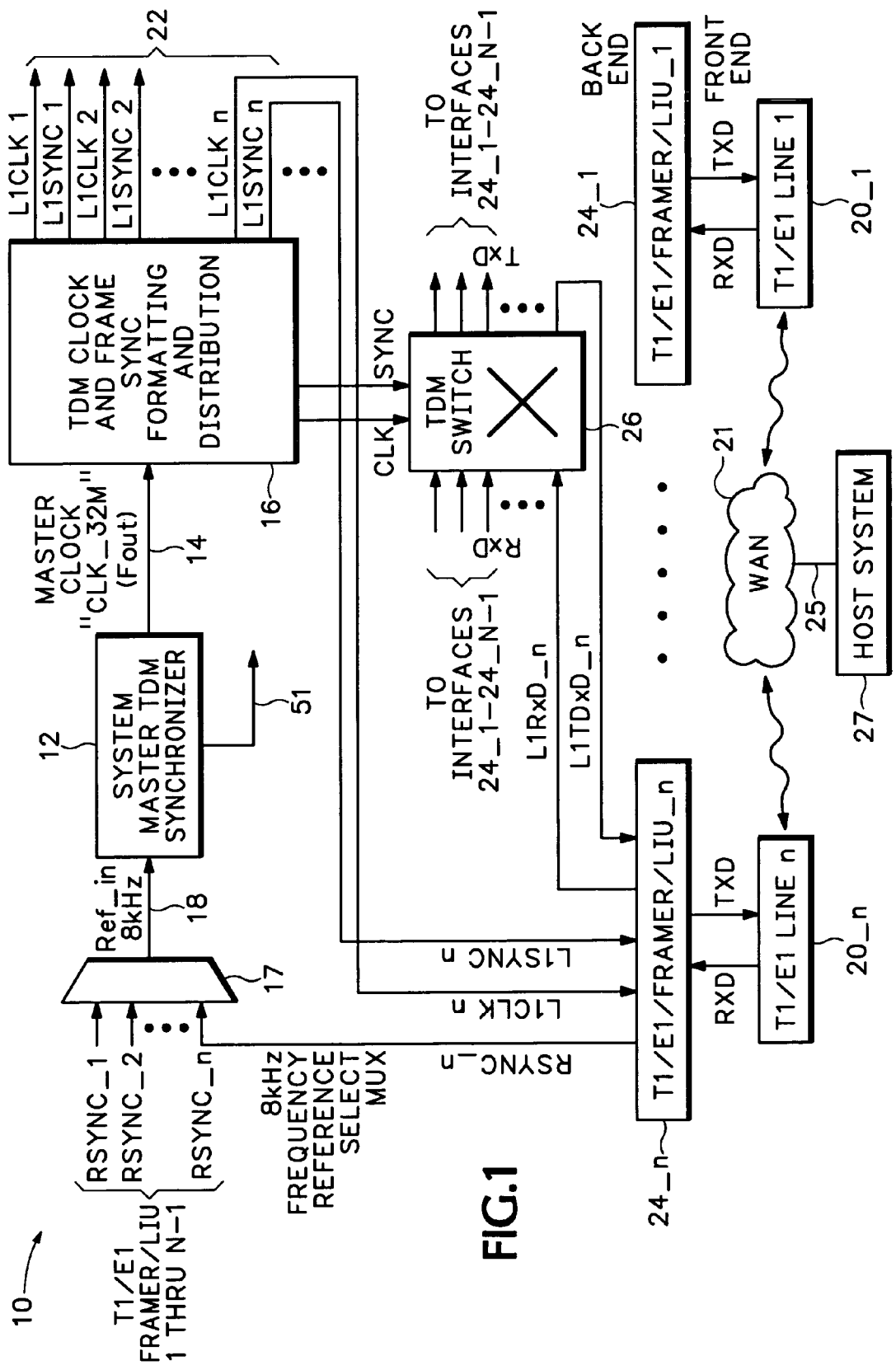
FIG. 1 is a block diagram of a host device TDM subsystem that includes a synchronizer circuit.
Figure 2:
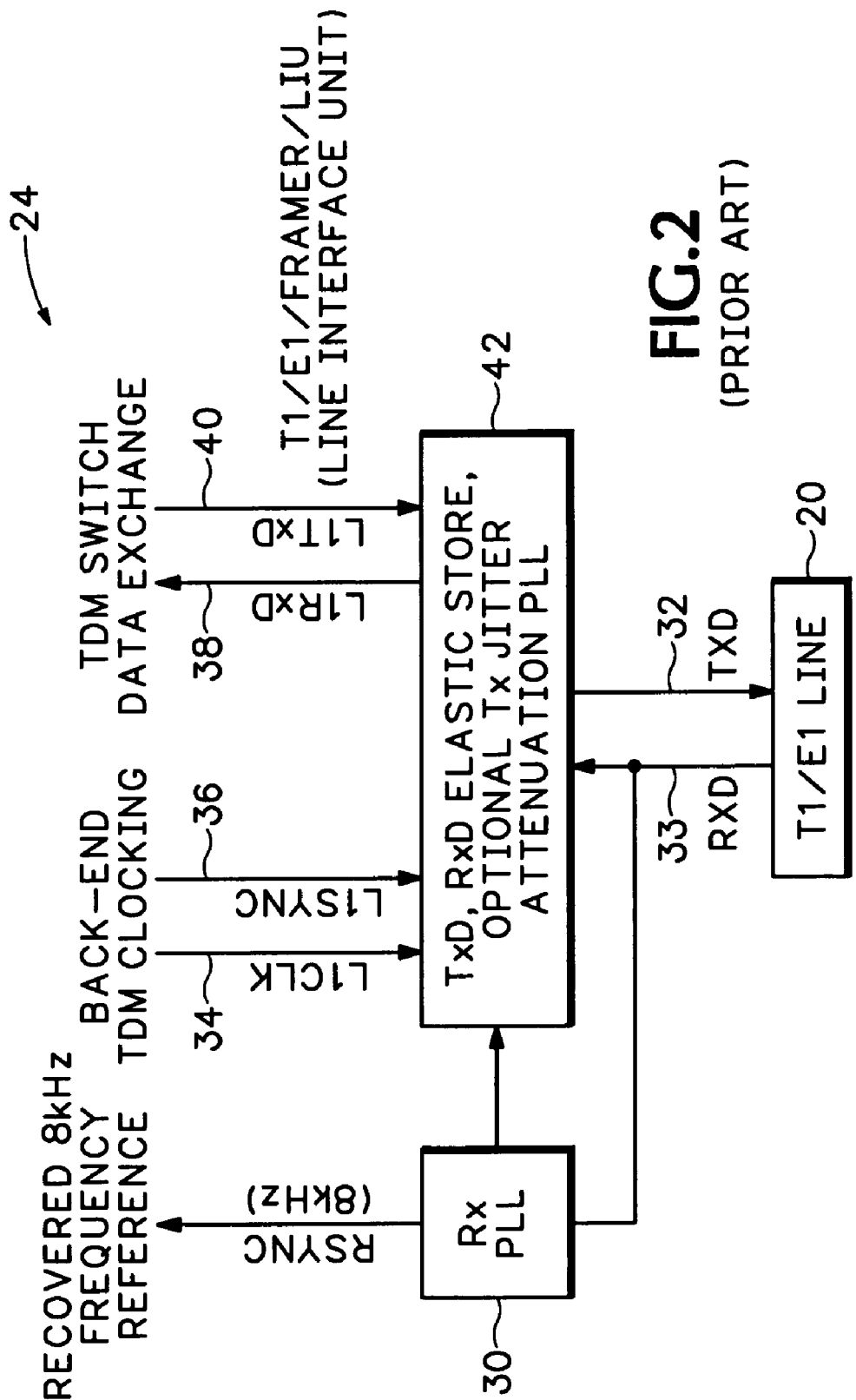
FIG. 2 is a block diagram of a Framer/Line Interface Unit used in the host device shown in FIG. 1.

The values of +/−80 ppm and +/−100 ppm are selected due to their ease of synthesis and for their appropriateness for testing the System Master TDM Synchronizer 12 (FIG. 1) capture/lock range, including guard banding around the +/−50 ppm E1 standard requirement. Of course, other offset values can be designed into the circuit shown in FIG. 4B.

To obtain a clean, registered output pulse with width>=100 ns, the pulsed stretched, delayed, equivalent of the 12-bit counter's modulo terminal count output is generated by registering with flip-flop 94 the output of an OR gate 92 that logically ORs the Pos_ppm_Q signal 82, Nom_ppm_Q signal 84, and Neg_ppm_Q signal 86. This yields the dithered frequency output for the offset cases. Since the dither counter 72 repeats every four or five 12-bit counter cycles, the fundamental frequency of the jitter of the dithered output is 8 kHz/4= 2 kHz for the 100 ppm cases or 8 kHz/5=1.6 kHz for the 80 ppm cases, respectively. The selected DPLL 56 (FIG. 3) is tolerant to this jitter, providing jitter transfer attenuation at its output. The analog PLL 54 provides additional jitter filtering.

Figure 4C:
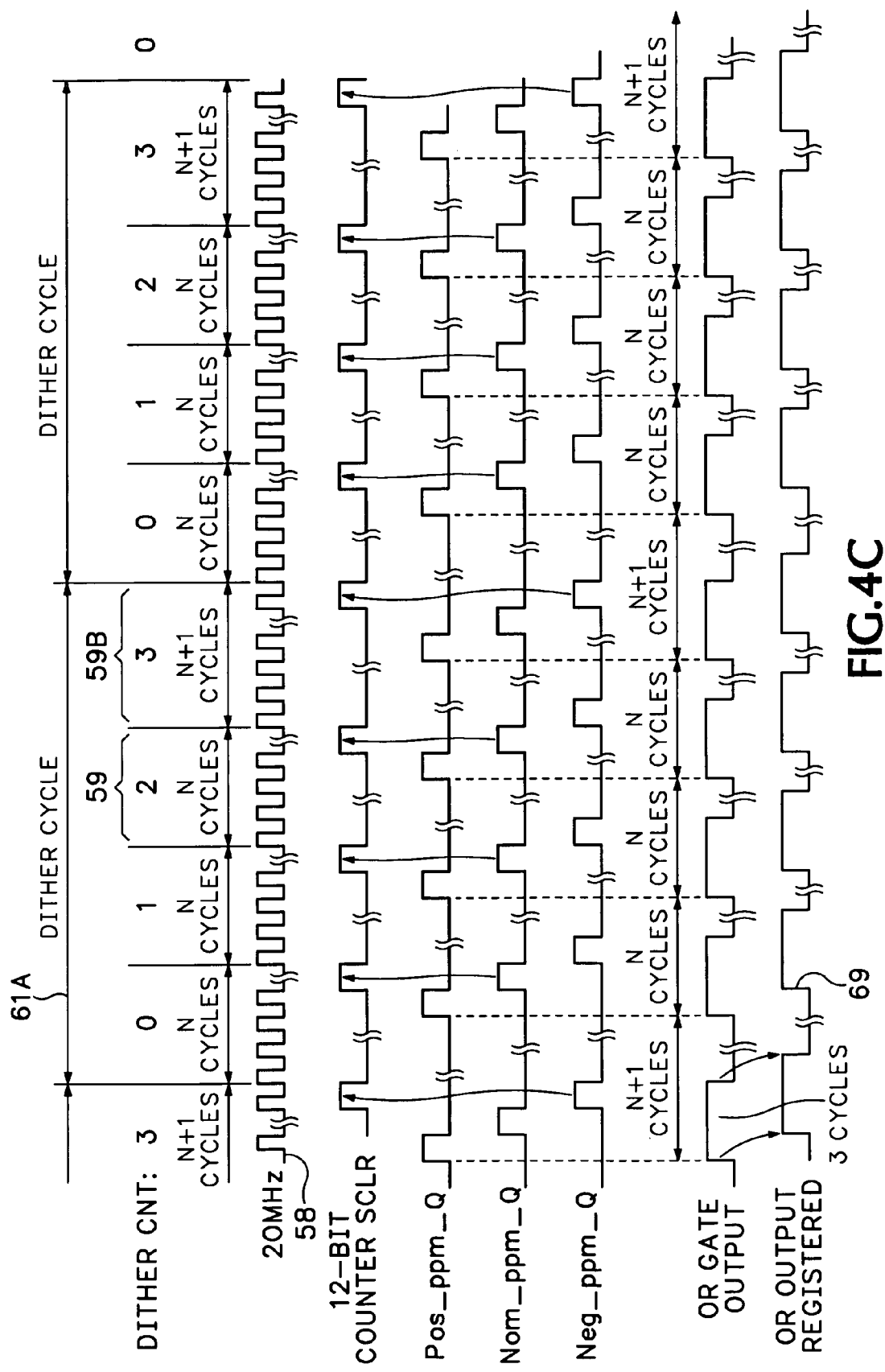
FIG. 4C is a timing diagram showing selected dithered reference counter signals.

FIG. 4C is a timing diagram showing generally how the frequency generator circuit 75 dithers the 8 kHz signal 67.

The clocking waveform 67 represents the dithering scheme example whereby the 12-bit counter 66 (FIG. 4B) is clocked either N or N+1 20 MHz clocks before being synchronously cleared. The value N corresponds with the selection of Nom_ppm_Q signal 84 for the 12-bit counter SCLR signal 67 of FIG. 4B. The value N+1 corresponds with the selection of the Neg_ppm_Q signal 86 for the 12-bit counter SCLR signal 67 of FIG. 4B.

In this example, one out of four 12-bit counter cycles 59 gets one additional 20 MHz clock period (50 ns). In a first dithering cycle 61A, cycle 59B gets the additional clock period. The average number of 20 MHz clock periods over one dither cycle 61A is (4N+1)/4. For N=2500, this amounts to 10001/4=2500.25. The resultant average output frequency of the SCLR signal 67=1/(50 ns*2500.25)=7999.20 Hz or 8 kHz−100 ppm, where (1−(7999.20/8000))*1,000,000=100 ppm. Similarly, the average output frequency of Pos_ppmQ, Nom_ppmQ, and Neg_ppm_Q signals is also 8 kHz−100 ppm. Logically OR'ing these three signals with OR gate 92 followed by a register 94 (FIG. 4B) results in a three-clock wide (150 ns), dithered output 69, suitable for delivery as reference input 18 to DPLL synchronizer 50 (FIG. 3).

The frequency generator 75 may be selected to have a positive ppm by periodically dropping a 50 ns clock period for signal 67. While +/−80 and +/−100 ppm dither values are described above, any variety of different +/−ppm values can be generated by varying the count parameters in counter 66 and counter 72. Further, the specific base frequencies of 20 MHz and 8 kHz are only base examples and any variety of different frequencies can be used.

FIG. 5 shows how the frequency generator 75 is used in the host device 10. The 20 MHz reference frequency from the system master TDM synchronizer 12 is fed into the frequency generator 75 and a dithered 8 kHz output signal 69 is fed into mux 17. An offset measurement circuit 98 detects the Ref_in input signal 18 and the Fout output signal 14. Although the offset measurement circuit 98 gets Ref_in signal from mux 17 as shown in FIG. 5, an independent mux 105 with inputs common to those of mux 17 could also be used.

With this alternative embodiment, while synchronizer 12 is configured to lock its output 14 to an externally derived RSYNC input via mux 17, the offset measurement circuit 98 could be delivered a different Ref_in from either the frequency generator 69 or from a different RSYNC input. This allows the offset measurement circuit 98 to use the selected RSYNC 18 used by the synchronizer 12 while synchronizer 12 is locked to that RSYNC 18. It also allows for relative measurements of other RSYNCs with respect to RSYNC 18.

The lock detect output 51 from the DPLL 50 (FIG. 3) and lock detect output signal output by measurement circuit 98 are used to distinguish phase lock failures in the DPLL 50 from phase lock failures in the APLL 54. For example, the lock detect output 51 may indicate that the DPLL 50 (FIG. 3) is locked. The output from offset measure circuit 98 may indicate the synchronizer 12 is not locked to Ref_in signal 18. In this case, the APLL 54 is assumed to be the case of the phase lock failure.

Control lines 99 from the host processor 100 in the host device 10 select the ppm offset that is output by the frequency generator 75. The processor 100 reads the measurements from the offset measurement circuit 98 derived by comparing the Ref_in signal 18 output from the mux 17 with the Fout signal 14 output by synchronizer 12. The processor 100 determines from these measurements if the synchronizer 12 has synchronized with various Ref_in ppm offset values. An external interface 102 can be used by an operator to select different ppm parameters for the frequency generator 75 and read the ppm offset results determined by the offset measurement circuit 98.

In one embodiment, the external interface 102 is a personal computer (PC) that communicates with the host processor 100 over an Internet Protocol (IP) connection 103. As previously explained, the host device 10 can be any system that provides testing of synchronization circuitry. When the host processor 100 detects a lock failure condition in synchronizer 12, it can automatically send a fault failure notification to the external interface 102.

Ref_in VS Fout Offset (Ppm) Measurement Scheme

Figure 6:
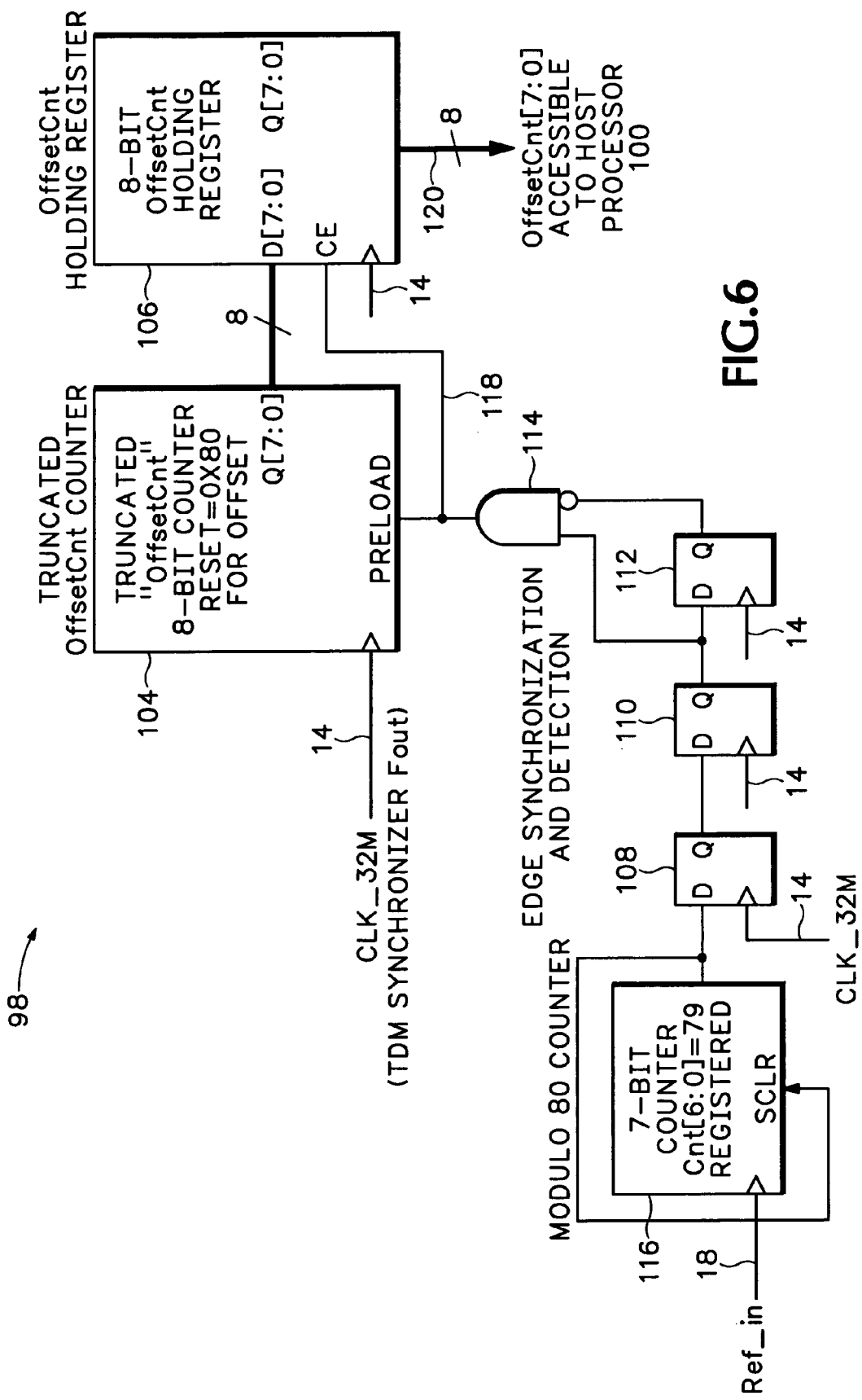
FIG. 6 is a block diagram of the frequency offset measurement circuit shown in FIG. 5.

FIG. 6 shows in more detail the offset measurement circuit 98 shown in FIG. 5. Referring to FIGS. 5 and 6, the offset measurement circuit 98 generates a truncated count of the number of Fout clocks 14 that have occurred between 80 edges of the active 8 kHz Ref_in signal 18. A modulo 80 counter 116 has a registered "cnt=79" output that goes high once every 80 edges of the Ref_in signal 18.

The flip-flops 108 and 110 synchronize the output of counter 116 with the 32 MHz clock 14. Flip-flop 112 is used in conjunction with AND gate 114 as a positive edge detector. This positive going edge is synchronized to the CLK_32M clock 14, resulting in a single CLK_32M wide pulse signal 118. The output of gate 114 is a pulse 118 that simultaneously and synchronously empties the contents of the counter 104 into a holding register 106 while re-initializing the DeltaCnt counter 104 to value 0x80.

Note that eighty base 10 edges for Ref_in signal 18 corresponds with a common multiple of possible dither periods (1, 4, or 5) used in the dithering 8 kHz+/−ppm frequency generator 75 scheme. Using a common multiple cancels the error associated with the frequency generator input dithering for the case in which the synchronizer 12 receives the frequency generator input at Ref_in 18. Although 20 is the least common multiple of 1, 4, and 5, the value 80 is selected in order to obtain finer measurement granularity resulting from a longer integration period. In this case, the count integration period is 80 edges*125 us/edge=10 ms. The pulse 118 goes high once every 10 ms. Thus, the counter 104 counts the number of 32 MHz clocks that occur every 10 ms. For more accuracy, the 10 ms count can be configured for a longer integration period.

The resultant count 120 is available to be polled by software controlling the host processor 100 (FIG. 5). The count 120 can be used to indicate whether or not the TDM synchronizer 12 is locked with the Ref_in input signal 18 by determining the relative ppm offset difference between the Ref_in signal 18 and the output signal 14. If the Ref_in signal 18 and the CLK_32M signal 14 have the same ppm offset, a known corresponding counter value will be generated by counter 104. Other known values output from counter 104 correspond to the Ref_in signal 18 having either more or less ppm offset than the CLK_32M output signal 14.

Only the least significant byte of counter 104 is counted, as the information contained in the higher order bits is unnecessary. For example, if the synchronizer 12 is locked, each 125 us period should result in 32.768 MHz/8.00 kHz=4096 counts. Lower order bits would simply be repeated for multiples of this count. If the offset counter 104 started from reset value=0x00, the actual count for the locked case would register (N*4096)−1 with the lower 8-bits=256−1=255(8'hff).

Preloading the counter 104 with a preset value=0x80 puts the nominal (locked case) offset count for the lower 8-bits at 0x7f, the center value of its range (0x00-to-0xff). This is more intuitive for the user and provides a more straightforward calculation for system software. Jitter in the 8 kHz reference signal 18 and in the 32 MHz output signal 14 may result in slight variations in the count. Such variations can be dealt with by using a system software averaging algorithm. When the synchronizer 12 is not locked, the lower order bit count will deviate from the center value.

For example, OffsetCnt=0x80+((N*0x100)−1)=0x7f (LS-Byte only) allows variations +0x80 or −0x7f either side of the nominal locked (0x7f) value to be calculated within that range using a simple calculation:

$$DeltaCnt = OffsetCnt - 0x7f$$

$$\#Cnts = (32.768\ MHz * (1 + offset\_ppm/1000000) * 10.0\ ms - 1)$$

where offset_ppm=CLK32M output ppm relative to Ref_in ppm

The following table provides count values for selected ppm offsets:

TABLE 2.0

| Offset (ppm) | # Cnts (dec) | # Cnts (hex) | OffsetCnt (# Cnts + 0x80) | DeltaCnt (OffsetCnt − 0x7f) | DeltaCnt (decimal) |
|---|---|---|---|---|---|
| +391 | 327807 | 0x5007f | 0xff | 0x80 | 128 |
| +100 | 327711 | 0x5001f | 0x9f | 0x20 | 32 |
| +32 | 327689 | 0x50009 | 0x89 | 0x0a | 10 |
| +10 | 327682 | 0x50002 | 0x82 | 0x03 | 3 |
| +5 | 327680 | 0x50000 | 0x80 | 0x01 | 1 |
| +3 | 327680 | 0x50000 | 0x80 | 0x01 | 1 |
| 0 | 327679 | 0x4ffff | 0x7f | 0x00 | 0 (Locked) |
| −2 | 327678 | 0x4fffe | 0x7e | −0x01 | −1 |
| −10 | 327675 | 0x4fffb | 0x7b | −0x04 | −4 |
| −32 | 327668 | 0x4fff4 | 0x74 | −0x0b | −11 |
| −100 | 327646 | 0x4ffde | 0x5e | −0x21 | −33 |
| −386 | 327552 | 0x4ff80 | 0x00 | −0x7f | −127 |

This scheme provides resolution of 3.05 ppm/Cnt+/−1.5 ppm accuracy. Software from host processor 100 (FIG. 5) reads the 8-bit OffsetCnt value 120 in the count register 106. To convert this to ppm, the following equation is used:

$$8\ kHz\ ref\_in\ \text{relative to}\ CLK\_=M\ \text{output}\ (ppm) = 3.05 * (0x7f - OffsetCnt)$$

Referring particularly to FIGS. 3 and 5 in one example, the DPLL 56 in the master synchronizer circuit 12 (FIG. 3) is configured for Free-Run mode. The 16.384 MHz signal 56 tracks the master 20 MHz OSCi clock 58 time base, rather than the Ref In signal 18 (FIG. 3). With an accurate, reliable, 20 MHz OSCi clock 52, the accuracy of Ref_in 18 can be measured relative to the stable, accurate, 20 MHz OSCi time base 58.

For example, the host device 10 may be installed in a network. The system master TDM synchronizer 12 may have been experiencing difficulty synchronizing to a particular one of the RSYNC_1–RSYNC_N signals. A technician may want to determine if a particular RSYNC signal frequency is outside an expected ppm range.

The technician places the synchronizer 12 in a free run mode where the Fout output 14 is generated from the internal 20 MHz clock 52. In one example, the clock 52 is within +/−4.6 ppm for a nominal 20 MHz frequency. The synchronizer 12 should then generate a CLK_32M Fout signal 14 within +/−4.6 ppm of the nominal 32.768 MHz. The offset measurement circuit 98 can then compare the Fout signal 14 with the selected RSYNC signal. Any ppm offset variance between the Fout signal 14 and the Ref_in signal 18 should be proportional to the ppm offset of the Ref_in signal 18+/−4.6 ppm.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A test circuit, comprising:
an input configured to receive a reference signal having a reference frequency;
an output configured to generate a synchronizer input signal having a synchronizer input frequency for inputting into a synchronizer circuit;
a frequency generator configured to vary the synchronizer input frequency at selectable frequency values offset from the reference frequency;
an offset measurement circuit configured to compare a frequency offset for a synchronizer input clock with a frequency offset for a synchronizer output clock;
a network processing device having multiple line interface units with associated clock signals from external T1, E1, or other synchronous communications lines; and
a selection circuit that selects one of the clock signals from the line interface units or an output from the frequency generator as an input to the synchronizer circuit.

2. The test circuit according to claim 1 wherein the frequency generator includes a first counter dividing the reference frequency into a sub-frequency output signal.

3. The test circuit according to claim 2 wherein the frequency generator includes a second counter adding frequency offsets to selectable cycles of the first counter output signal.

4. The test circuit according to claim 1 including a host processor that selects the frequency values offset for the synchronizer input signal.

5. The test circuit according to claim 1 including a selector for selecting an input clock for the offset measurement circuit different than an input clock used for the synchronizer circuit.

6. The test circuit according to claim 1 including a test selector that selects one of the clock signals from the line interface units or the synchronizer input signal output from the frequency generator as an input to the frequency measurement.

7. A test circuit comprising:
an input configured to receive a reference signal having a reference frequency;
an output configured to generate a synchronizer input signal having a synchronizer input frequency for inputting into a synchronizer circuit; and
a frequency generator configured to vary the synchronizer input frequency at selectable frequency values offset from the reference frequency, wherein the frequency generator includes:
a first counter dividing the reference frequency into a subfrequency output signal;
a second counter adding frequency offsets to selectable cycles of the first counter output signal;
a first delay circuit receiving the output of the first counter representing a positive frequency offset signal and outputting a nominal frequency offset signal; and
a second delay circuit receiving the nominal frequency offset signal and outputting a negative frequency offset signal to the second counter.

8. The test circuit according to claim 7 including an offset measurement circuit configured to compare a frequency offset for a synchronizer input clock with a frequency offset for a synchronizer output clock.

9. The test circuit according to claim 8 including a selector for selecting an input clock for the offset measurement circuit different than an input clock used for the synchronizer circuit.

10. The test circuit according to claim 7 wherein the frequency generator includes selection circuitry selectively combining the positive or negative frequency offset signals with the nominal frequency offset signal to form the synchronizer input signal.

11. The test circuit according to claim 10 wherein the frequency generator includes an output circuit configured to generate the synchronizer input signal by combining the output from the first counter with the outputs from the first and second delay circuits.

12. The test circuit according to claim 11 wherein the output circuit includes a logical OR gate and a flip-flop that stretch out pulse durations in the synchronizer input signal.

13. A test circuit, comprising:
an input configured to receive a reference signal having a reference frequency;
an output configured to generate a synchronizer input signal having a synchronizer input frequency for inputting into a synchronizer circuit;
a frequency generator configured to vary the synchronizer input frequency at selectable frequency values offset from the reference frequency; and
an offset measurement circuit configured to compare a frequency offset for a synchronizer input clock with a frequency offset for a synchronizer output clock, wherein the offset measurement circuit includes a first counter counting pulses for the synchronizer output clock and a second counter resetting the first counter over a time period proportional to a number of counted pulses of the synchronizer input clock or another external input clock.

14. The test circuit according to claim 13 wherein the first counter is configured with a preset value resulting in a centered output count value for a nominal frequency offset condition.

15. The test circuit according to claim 13 including:
a network processing device having multiple line interface units with associated clock signals from external T1, E1 or other synchronous communications lines; and
a selection circuit that selects one of the clock signals from the line interface units or an output from the frequency generator as an input to the synchronizer circuit.

16. The test circuit according to claim 15 including a test selector that selects one of the clock signals from the line interface units or the synchronizer input signal output from the frequency generator as an input to the frequency measurement.

* * * * *

UNITED STATES PATENT AND TRADEMARK OFFICE
CERTIFICATE OF CORRECTION

PATENT NO. : 6,965,224 B1
APPLICATION NO. : 10/440276
DATED : November 15, 2005
INVENTOR(S) : Hey It is certified that error appears in the above-identified patent and that said Letters Patent is hereby corrected as shown below:

At column 5, line 18 please replace "Nom_ppm Q" with --Nom_ppm_Q--

At column 7, line 18 please replace "Pos_ppmQ, Nom_ppmQ," with --Pos_ppm_Q, Nom_ppm_Q--

At column 9, line 47 please replace "CLK_=M" with --CLK_32M--

At column 9, line 53 pleae replace "Ref In signal 18" with --Ref_In signal 18--

At column 10, line 54 please replace "sub-frequency" with --subfrequency--

At column 11, line 4 please replace "circuit comprising:" with --circuit, comprising:"

At column 12, line 29 please replace "T1, E1 or other" with--T1, E1, or other--

Signed and Sealed this

Ninth Day of January, 2007

JON W. DUDAS
*Director of the United States Patent and Trademark Office*